United States Patent [19]

Brewer et al.

[11] Patent Number: 4,634,357
[45] Date of Patent: Jan. 6, 1987

[54] BEAD SEAL RING UNIT

[75] Inventors: Donaldee Brewer; Ronald R. Seiler; Thomas J. Niedergeses, all of Muscatine, Iowa

[73] Assignee: Bandag Licensing Corporation, Muscatine, Iowa

[21] Appl. No.: 796,458

[22] Filed: Nov. 8, 1985

[51] Int. Cl.[4] ............................................. B29C 33/00
[52] U.S. Cl. ........................................ 425/36; 156/397; 156/398; 249/205; 277/188 R; 277/207 R
[58] Field of Search .............. 425/36; 156/397, 398; 277/235, 188 R, 188 A, 203, 204, 207 R; 249/205

[56] References Cited

U.S. PATENT DOCUMENTS

| | | | |
|---|---|---|---|
| 1,940,582 | 12/1933 | DeMattia | 425/36 |
| 2,475,579 | 7/1949 | Napier | 425/36 |
| 2,966,936 | 1/1961 | Schelkmann | 156/96 |
| 3,184,794 | 5/1965 | Sherkin | 425/36 |
| 3,236,709 | 2/1966 | Carver | 156/96 |
| 3,802,978 | 4/1974 | Barnett | 156/96 |
| 3,884,740 | 5/1975 | Schelkmann | 156/96 |
| 3,895,985 | 7/1975 | Schelkmann | 156/96 |
| 3,966,535 | 6/1976 | Abularach | 156/96 |
| 4,129,474 | 12/1978 | Martin | 156/96 |
| 4,175,991 | 11/1979 | Harrelson | 156/96 |
| 4,242,169 | 12/1980 | DeHaven | 156/397 |
| 4,274,897 | 6/1981 | Barefoot | 156/96 |
| 4,309,234 | 1/1982 | Witherspoon | 156/96 |

FOREIGN PATENT DOCUMENTS 522114 11/1951 Canada ..................... 425/36
2032858A 5/1980 United Kingdom .

*Primary Examiner*—Willard E. Hoag
*Attorney, Agent, or Firm*—Frank B. Hill

[57] ABSTRACT

A bead seal ring for use in the retreading of radial tires by use of a bead sealing ring unit that provides positive mechanical pressure for sealing the curing envelope between the bead sealing ring unit and the bead area of the tire by a radial force. In its relaxed or initial condition, the bead sealing ring unit has a diameter smaller than the bead diameter of the tire. The bead sealing ring unit is placed into sealing position and then expanded by a locking device secured to a metal band which is part of the bead sealing ring unit.

11 Claims, 16 Drawing Figures

BEAD SEAL RING UNIT

BACKGROUND OF THE INVENTION

This invention relates to a retreading system for curing radial constructed tires. In this system of retreading, the curing envelope is sealed by expanding a rubber ring in the radial direction causing the seal to take place in the radial direction on the axial bead surface. This sealing system permits easy positioning of the bead seal ring unit because the diameter is smaller than the diameter of the tire's bead member when it is in the relaxed position, and in the expanded position there is a positive sealing action between the ring unit and the bead member of the tire securely sealing the curing envelope.

It is conventional in retreading to seal the curing envelope between the sidewall or side surface of the tire. Examples of sealing systems used in retreading systems are described in detail in U.S. Pat. Nos. 2,966,936, 3,236,709, 3,802,978, 3,884,740, 3,895,985, 3,966,535, 4,129,474, 4,175,991, 4,242,169, 4,274,897, and 4,309,234. These references disclose various concepts of sealing the curing envelope bewteen a mechanical structure and the sidewall or side surface of the tire casing.

One known invention attempting to seal in the radial direction was disclosed in United Kingdom Application No. GB2,032,858A is the closest known reference in regards to the present invention.

SUMMARY OF THE INVENTION

The present invention provides a positive sealing method using a bead seal unit assembly to be located in a sealing position and expanded in the radial direction to provide positive sealing action along the axial surface of the tire bead member. This is accomplished by the bead seal unit assembly having a rubber ring which has a diameter smaller than the diameter of the tire bead and is expandable in the radial direction sealing the curing envelope between the rubber ring and the axial surface of the tire bead member.

In the preferred embodiment there is a uniform and constant pressure provided by the rubber ring when sealing the curing envelope.

In a preferred embodiment the positive sealing feature provides accommodation for variations in tire brands and constructions due to its positive mechanical expandability capabilities of the resilient surface of the rubber ring.

In the preferred embodiment the rubber ring of the bead seal unit assembly has ridges which allow good sealing and gripping of the curing envelope to provide positive sealing. This permits testing of the curing envelope to assure that there are no leaks in the envelope before running a retreaded tire casing through the curing operation.

In the preferred embodiment the bead seal unit assembly provides replaceability of the rubber rings when necessary in an easy and fast manner to provide for economic operation of the unit assembly by conserving cost and time for replacement and installation of a new rubber ring.

In the preferred embodiment the bead seal unit assembly's locking mechanism assembly provides positive indication of sealing pressure by the unit assembly during the sealing operation. This gives visual notice to the operator if the rubber ring member of the bead seal unit assembly must be replaced.

The locking mechanism assembly is designed to provide an over center locking feature. The locking mechanism latches in a manner to force positive sealing. When in its locked condition, if any additional forces act on it, these forces tend to move the locking mechanism into the locking position and not to the unlocked position, which would eliminate the sealing pressure.

DETAILED DESCRIPTION

The invention will be further understood from the following more detailed description taken with the drawings in which.

Figure 1:
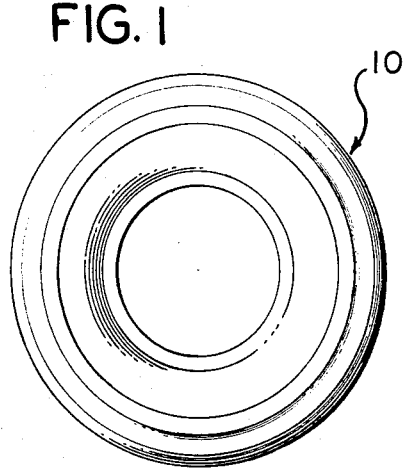
FIG. 1 is a side view of a standard radial tire.
Figure 2:
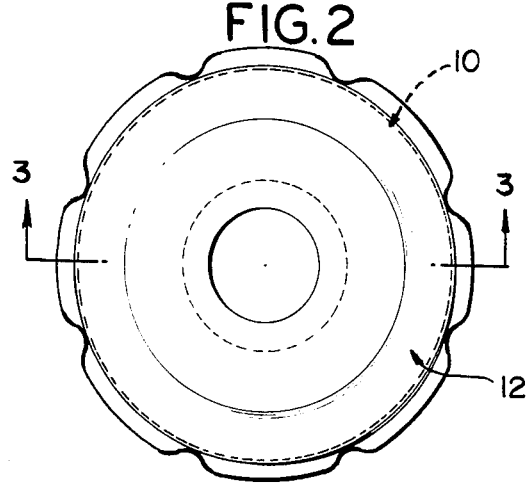
FIG. 2 is a side view of a standard radial tire as viewed in FIG. 1 that has been prepared for retreading and has a curing envelope in place.

Referring to FIG. 1, there is illustrated a radial tire generally by number 10. After the radial tire has been prepared for retreading, it is covered with a curing envelope 12, as shown in FIG. 2. This is typical for many retreading operations with the possible exception that the curing envelope is more fully skirted or extends further toward the center of the tire.

Figure 3:
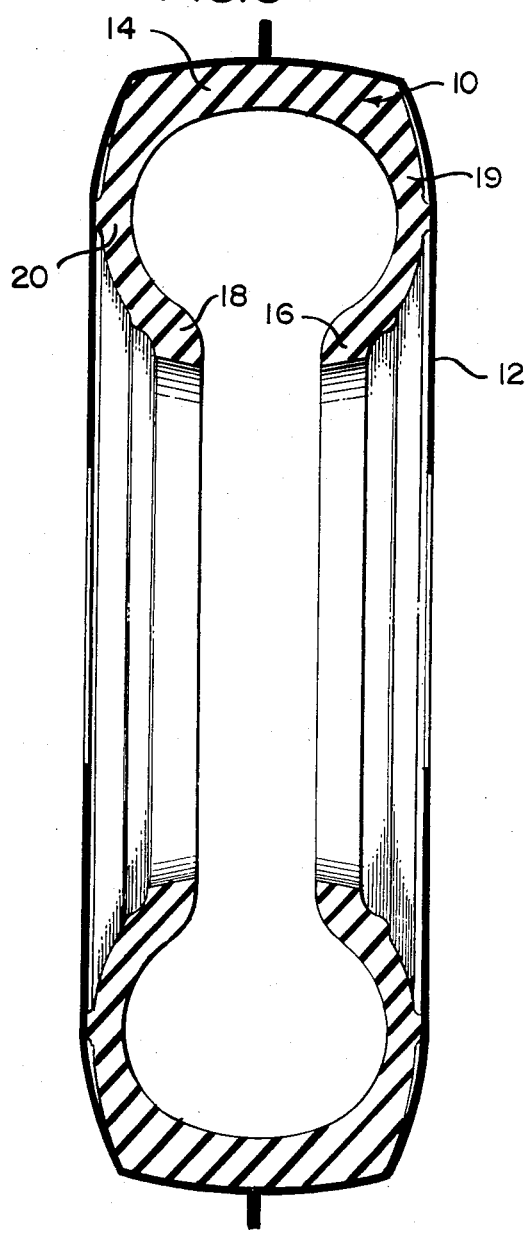
FIG. 3 is a cross-section of the tire assembly as illustrated in FIG. 2 taken along line 3—3 of FIG. 2.

Referring generally to FIG. 3, we have the radial tire 10 with a crown area 14 and bead member areas 16 and 18. The crown area 14 connects the bead areas 16 and 18 by sidewall sections 19 and 20. The curing envelope 12 extends around the tire 10 and past the bead areas 16 and 18.

Figure 4:
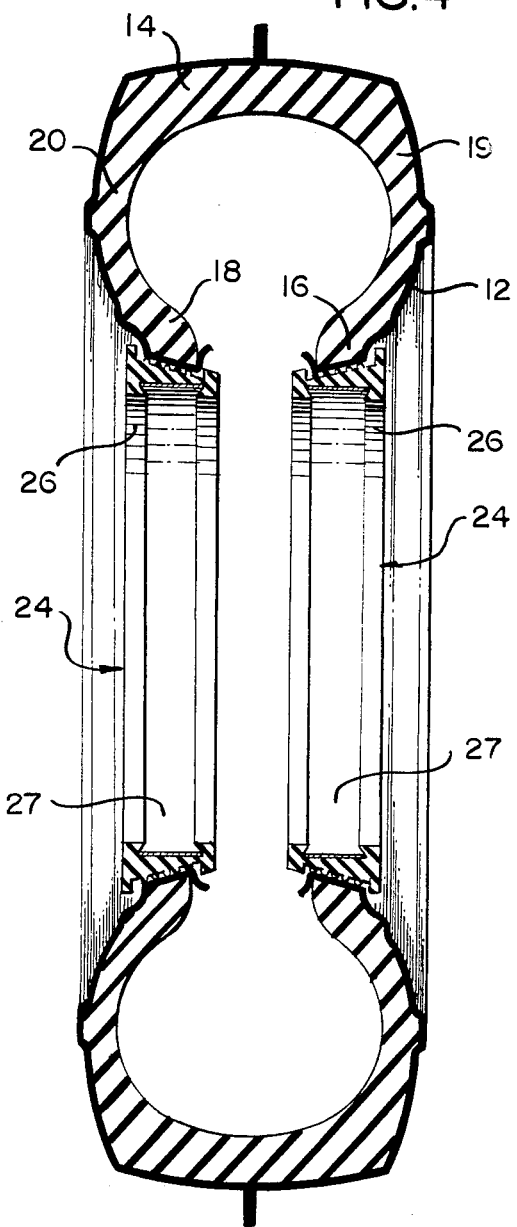
FIG. 4 is a cross-sectional view of a tire assembly similar to FIG. 3 with the bead seal ring unit assemblies in place for curing.

Referring to FIG. 4, bead seal ring unit assemblies 24 have been placed in sealing position and were expanded mechanically in the radial direction to make positive sealing contacts with the bead areas 16 and 18. This view illustrates the principles of the present invention.

Figure 13:
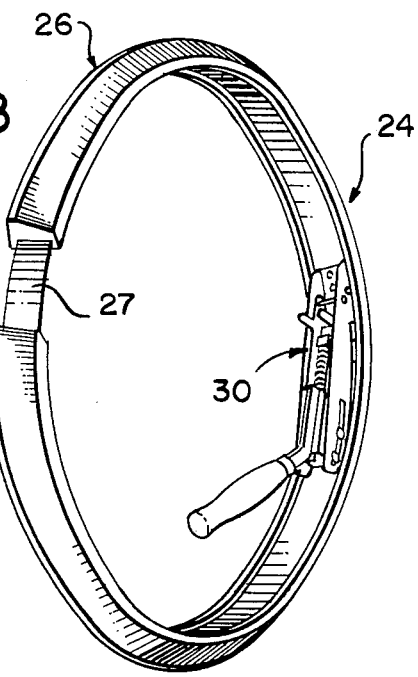
FIG. 13 is a perspective view of the bead seal ring unit assembly with the rubber ring and the locking mechanism in place.

FIG. 13 shows the bead seal ring unit assembly 24 in partial cross-section showing the rubber ring 26 positioned around the metal band 27. Metal band 27, as shown in FIG. 2, has overlapping ends to complete its circular embodiment. The inside end is identified as 28 and the outside end is identified as 29. The locking mechanism 30 is connected to the outside end 29 and the inside 28. The locking mechanism 30 is so constructed that the metal band 27 will be in its small diameter position when the locking mechanism 30 is in the unlocked position and in the expanded position when the locking mechanism 30 is in the locked position. This will be explained in detail below.

Figure 5:
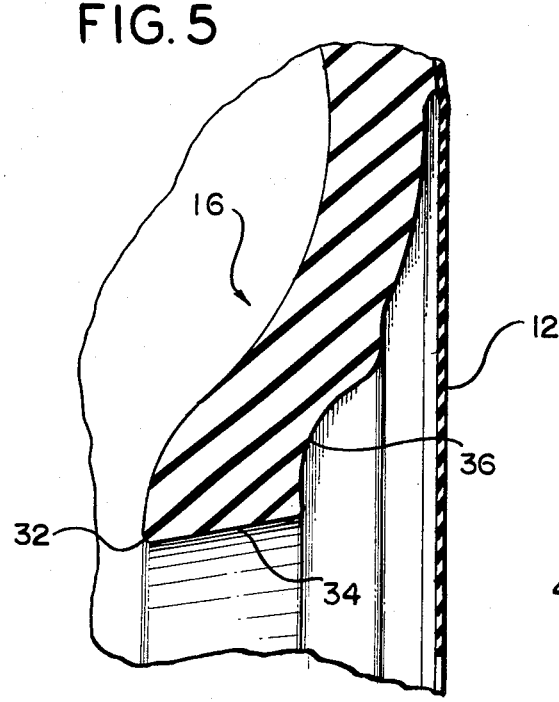
FIG. 5 is an enlarged version of the bead area of the tire assembly shown in FIG. 3, illustrating the relationship between the curing envelope and the bead member.

Referring to FIG. 5, we have an enlarged view of the bead area 16 which has a bead toe 32 and an axial bead surface 34 and a bead side surface 36. The envelope 12 extends alongside of the bead area and out of contact with it before the bead seal ring unit assemblies 24 are placed in sealing position. The curing envelope 12 is flexible but exhibits a stiff characteristic before being moved into sealing position.

Figure 10:
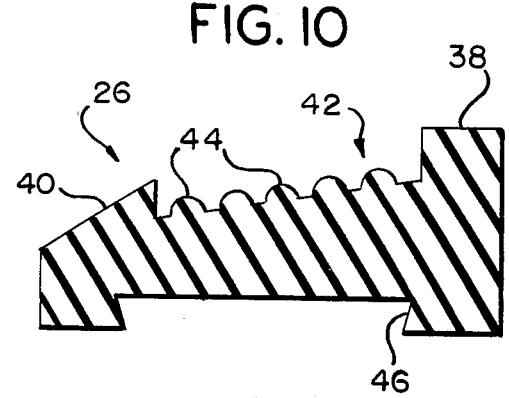
FIG. 10 is a cross-sectional view of a rubber ring showing its configuration.
Figure 11:
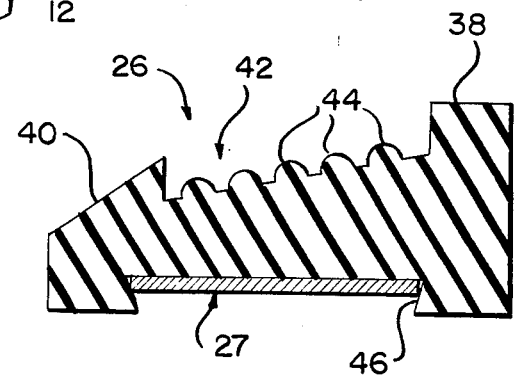
FIG. 11 is similar to FIG. 10 showing a metal band in position with the rubber ring when assembled.
Figure 12:
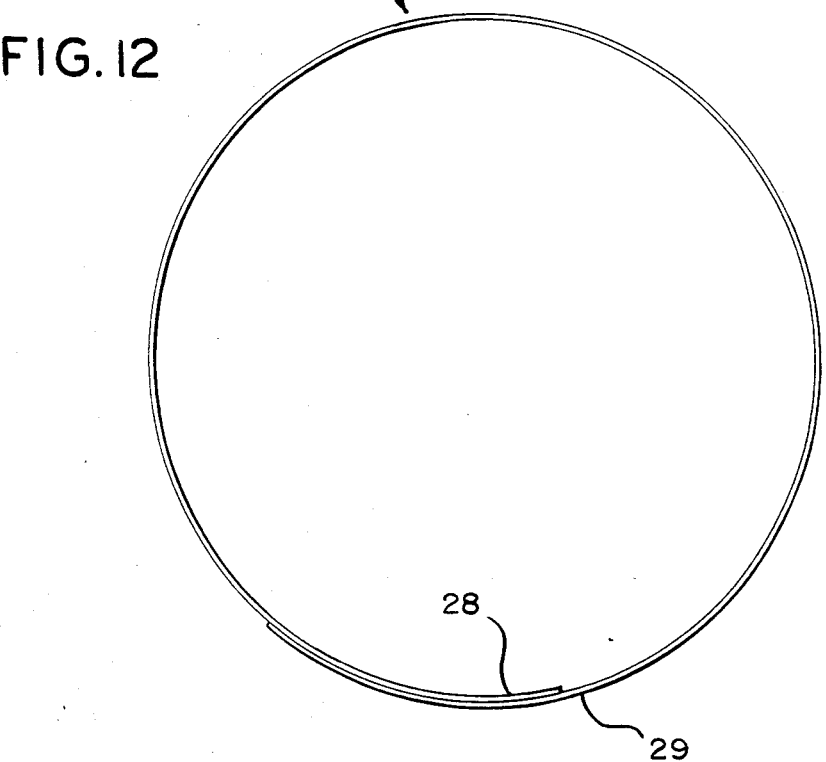
FIG. 12 is a side view of a metal band without the locking mechanism or the rubber ring.

Referring to FIG. 10, we have a cross-sectional view of the rubber ring 26. The rubber ring has a position flange 38 and a hook flange 40. The flanges 38 and 40 are connected by sealing surface 42 at their upper side. The sealing surface in the preferred embodiment, as shown in FIG. 10, has a series of sealing ribs 44. At the lower surface, the flanges 38 and 40 are connected by a receiving groove 46. In the preferred embodiment, the receiving groove 46 has slanted side surfaces 47 so that they can receive the metal band 27 and hold it in place, as illustrated in FIG. 11.

Figure 6:
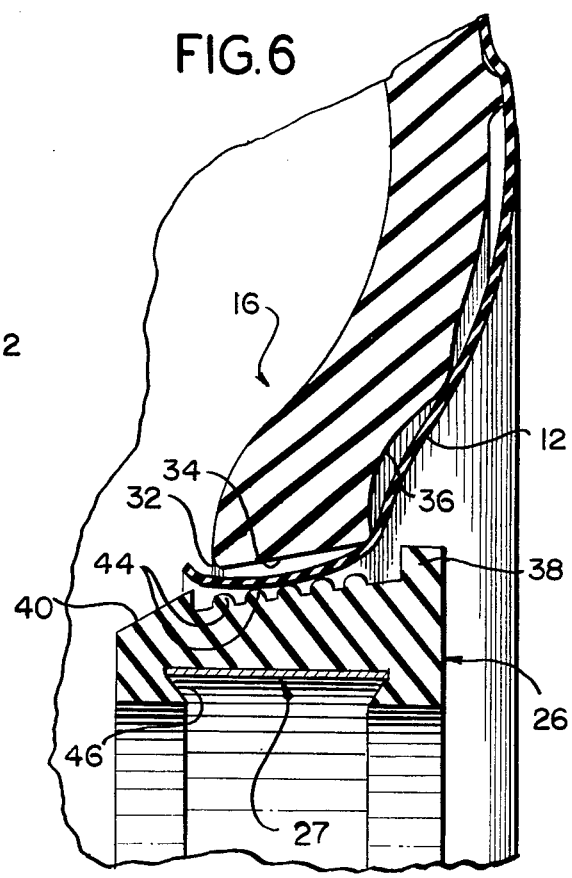
FIG. 6 is a view similar to FIG. 5 showing the bead seal unit assembly in a sealing position before it had expanded into sealing contact.
Figure 7:
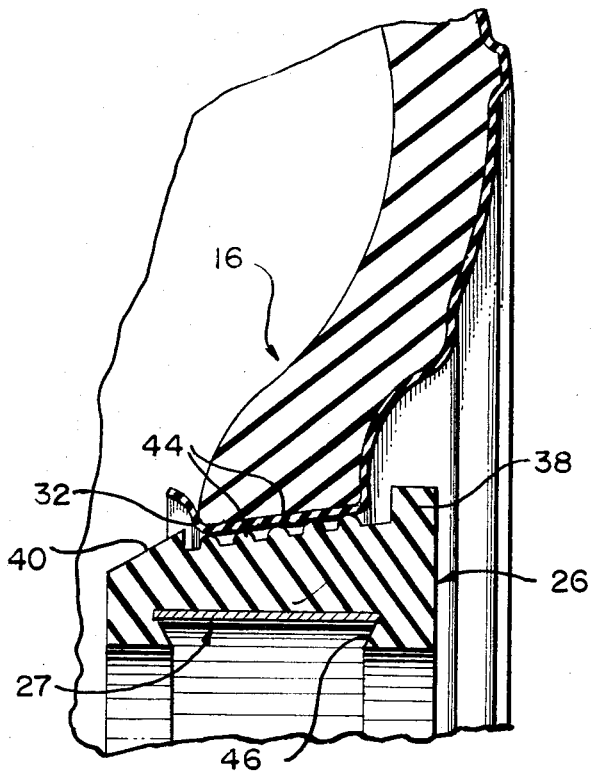
FIG. 7 is a view similar to FIG. 6 showing the bead seal unit assembly in the expanded condition with the rubber ring sealing the curing envelope between itself and the axial surface of the bead member.

When the rubber ring 26 is moved into sealing position, it will contact the curing envelope 12 and move it between the axial bead surface 34 and the sealing surface 42 of the rubber ring 26, as illustrated in FIG. 6. At this time, the locking mechanism 30 is in the unlocked position and the metal band is in its smallest diameter position. The rubber ring 26 has a diameter smaller than the bead area diameter so that sealing contact is not made at this time.

Figure 8:
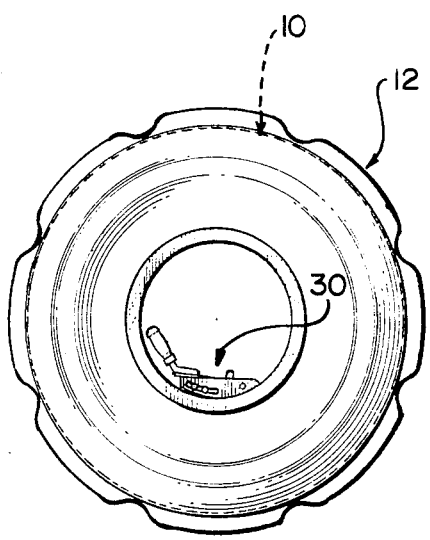
FIG. 8 is a side elevation view of the tire assembly in condition for curing with the bead seal unit assemblies in place.

After the rubber ring 26 is in sealing position, the locking mechanism 30 is moved to the locked position, by expanding the diameter of the rubber ring 26 so that the curing envelope is sealed between the axial bead surface 34 and the sealing surface 42 of the rubber ring 26. The sealing ribs provide multiple gripping contacts so that curing envelope is firmly held in place. The bead area 16 is rigid and a sufficient amount of pressure can be placed between the bead seal ring unit assembly 24, in the expanded position, and the bead member 16 so that the curing envelope 12 is securely sealed. This sealing is important to give proper cure and also it provides an opportunity for the retreading shop to inflate the curing envelope to ensure there is no leakage in the sealing or in the envelope before the expense of running the tire through the retreading operation. FIG. 8 illustrates a radial tire after it has been enveloped and sealed and is ready to be placed into a curing chamber.

When the bead seal ring unit assembly 24 is moved into sealing position and then expanded in sealing contact, there must be some flexibility in the system because various tire manufacturers have different configurations in reference to the bead area structure. The axial bead surface 34 is at a slight angle in reference to the axis of the tire. Typical angles would be 15°–19°. As the rubber ring 26 is expanded, the hook flange 40 will wrap the end of the curing envelope 12 past the inside of the bead toe 32, as seen in FIG. 6. The hook 40 prevents the rubber ring 26 from moving out past the bead toe 32 when in the expanded condition. The positioning flange 38 prevents the bead seal ring unit assembly 24 from extending past the bead side surface 36.

The metal band 27 and the rubber ring 26 are positioned together to form the bead seal ring unit assembly. After a period of time, the rubber ring can lose its resilience, thus affecting its sealing capabilities, and will have to be replaced. The replacement is easily made by putting the metal band 27 in the unlocked position and removing the rubber ring 26 from the metal band. The resiliency of the rubber ring 26 can be monitored visually by the locking mechanism as will be explained in more detail below.

Figure 14:
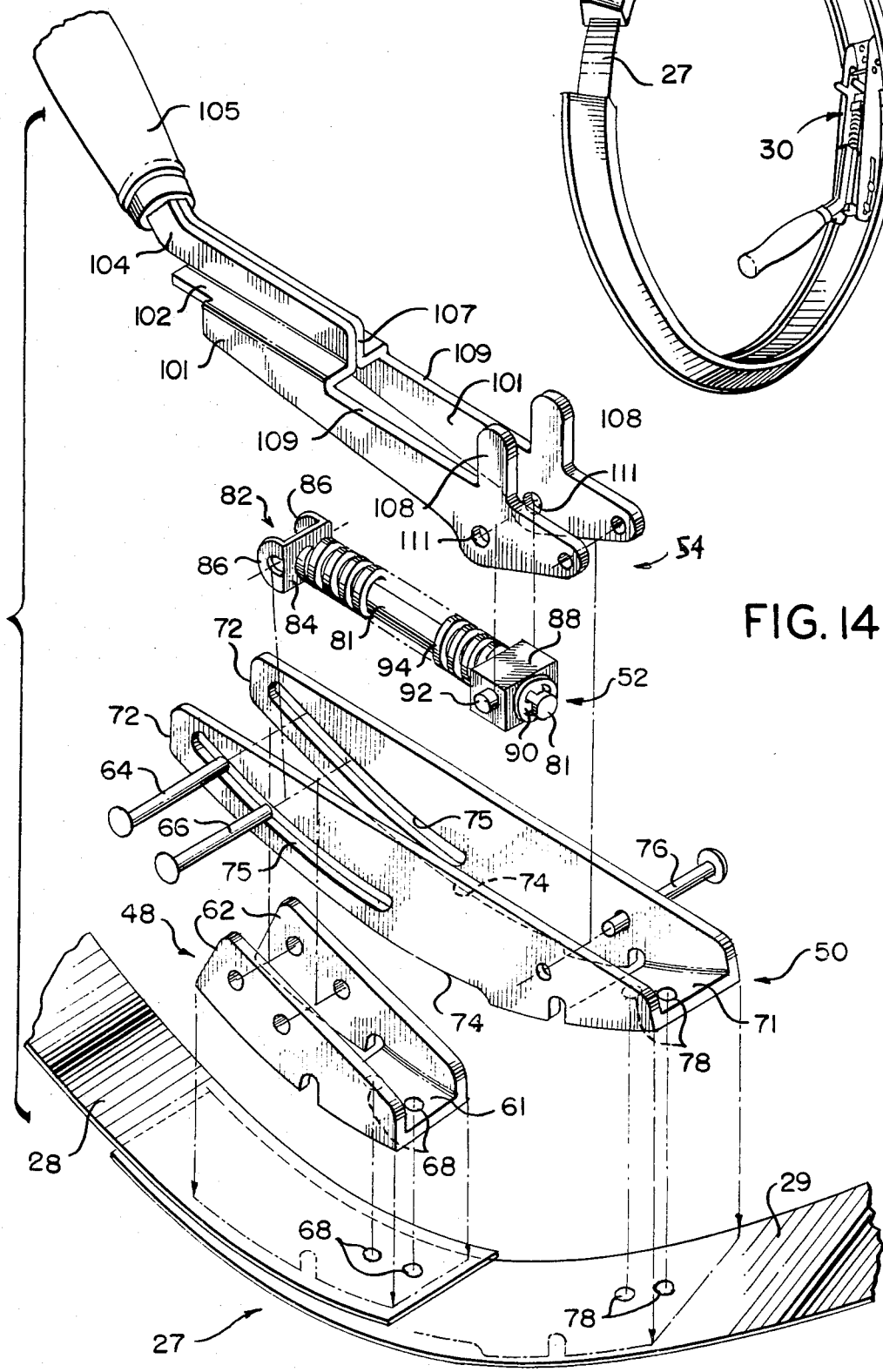
FIG. 14 is an exploded perspective view of the locking mechanism in conjunction with the metal band.

Referring to FIG. 14, there is an exploded view of the locking mechanism 30. The locking mechanism is connected to and operates the metal band 27. The locking mechanism 30 has four major elements. These include a band bracket 48, a slide bracket 50, a spring assembly 52, and a handle bracket 54.

The band bracket 48 has two side plates 62 connected to a securing plate 61 and provides the connection to the inside end 28 of the metal band 27 for the locking mechanism 30. Near the back of the side plates 62, there are provided holes to receive a guide pin 64 and a spring pin 66. The bracket 48 is secured to the inside end 28 of the metal band 27 by connecting rivets 68.

Slide bracket 50 has two slide plates 72 connected to support plate 71. The slide plates 72 are provided with undercuts 74, the function of which will be explained later. The side slide plates 72 are provided with guide slots 75. The guide pin 64 and spring pin 66 pass through the guide slots 75. The slide plates 72 at their front end, are provided with openings to receive pivot pin 76, which extend across the support plate 71 and are secured in the slide plates 72. The slide bracket 50 is secured to the outside end 29 of the metal band 27 by connecting rivots 78. The side slide plates 72 are positioned outside the side plates 62 of the band bracket 48 when the unit is assembled. The undercuts 74 permit the slide bracket 50 to be moved in relation to the band bracket 48 without making contact with the inside end 28 of metal band 27 until in the fully unlocked position.

Spring assembly 52 has a spring shaft member 81 with a yoke member 82 positioned on one end. The yoke member 81 has a yoke plate 84 that is connected to the shaft member 81 and connects to two side members 86. The two side members 86 have openings which receive the spring pin 66. On the other end of the shaft member 81, is a pivot block 88. The pivot block 88 has an opening permitting the shaft 81 to pass through the pivot block 88 and a control cap 90 is secured to the end of the shaft 81. On the side of the pivot block 88 are pivot studs 92. A spring 94 is positioned around the shaft 81 and applies force to the yoke plate 84 and to the pivot block 88. When under normal conditions, the spring will exert pressure between these members causing the control cap 90 to make contact with the pivot block 88.

The handle bracket 104 has side plates 101 that are connected by connection plate 102. A handle arm 104 is secured to the connection plate 102 at one end and has a handle 105 at the other end. Above the connection plate 102, the handle arm has a control edge 107. The side plates 101 have control flanges 108 extending up from the side plates. The side plates 101 have openings identified as pivot stud openings 111 which receive the pivot studs 92. Near the front end of the side plates 101 are provided openings which permit the pivot pin 76 to pass through.

Figure 15:
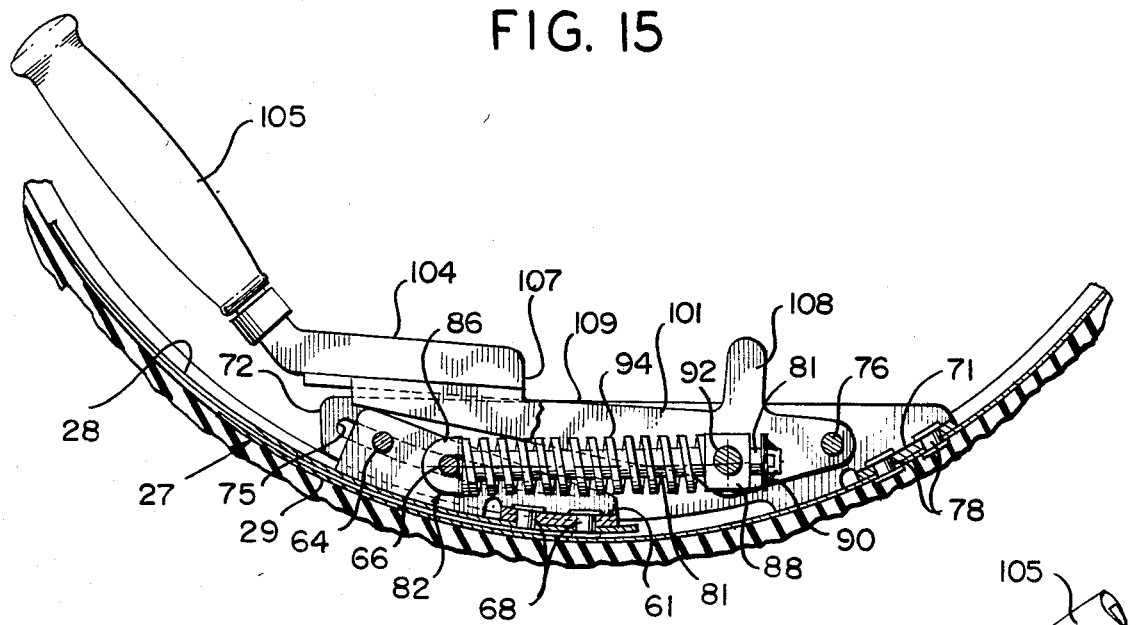
FIG. 15 is a side sectional view of the locking mechanism in the locked or expanded position.
Figure 16:
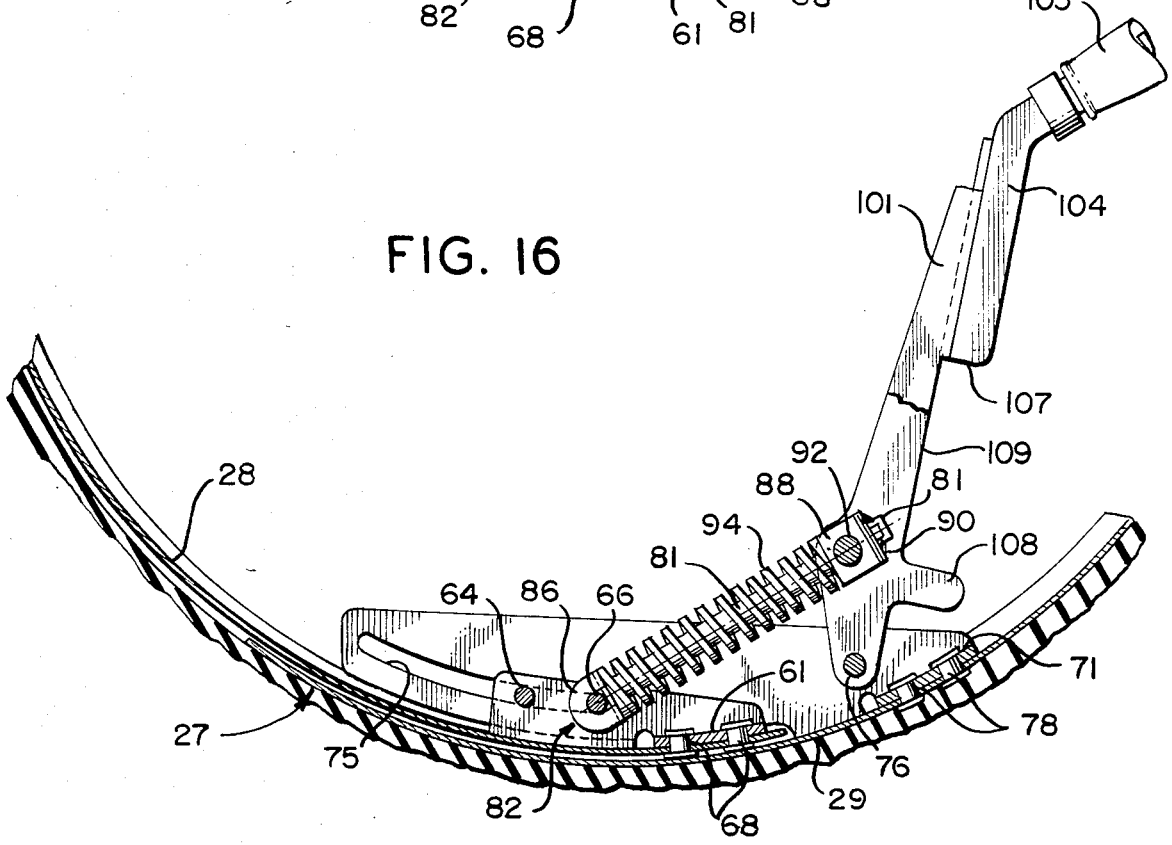
FIG. 16 is a side sectional view of a locking mechanism in the unlocked or retracted position.

Referring to FIG. 16, we show the locking mechanism in the relaxed or unlocked position. The inside end 28 and the outside end 29 of the metal band 27 are overlapped at their maximum amount when the handle is fully moved into the unlocked position. This is a condition in which the locking mechanism 30 is in when the bead seal ring unit assembly 24 is placed into sealing position. Sealing contact is then secured by moving the handle in a counter-clockwise direction, as viewed in FIGS. 15 and 16, to its maximum locked position as illustrated in FIG. 15. The handle bracket 54 is rotated about the pivot pin 76. This moves the pivot block 88 so that it tends to compress spring 94. This exerts force on the spring pin 66 moving to band bracket 48 away from the support plate 71 of the slide bracket 50, causing the metal band to expand its circumference and its diameter. After the rubber ring 26 makes sealing contact with the bead area and the resilience of the rubber ring 26 is compressed, additional force will be taken up by the pivot block 88 moving along the spring shaft member 81. This moves the control cap 90 away from contact with the pivot block 88, as viewed in FIG. 15. In this position, the center line of pivot studs 92 is positioned below a line running from the center line of spring pin 66 and pivot pin 76. This provides an over-center self-locking feature. Any pressure applied to the metal ring 27 to compress it will force the locking mechanism 30 to be driven towards the locked position and away from the unlocked position.

During operating conditions after a period of time, as mentioned above, the resiliency of the rubber ring will have been lost. At that time, a new rubber ring 26 should be put in place. The operator can identify when there is need for a new rubber ring 26 when the control cap 90 is not positioned away from the pivot block 88 when in the locked postion. This is a visual inspection that can be easily made, preventing curing tires when proper sealing has not been engaged.

Figure 9:
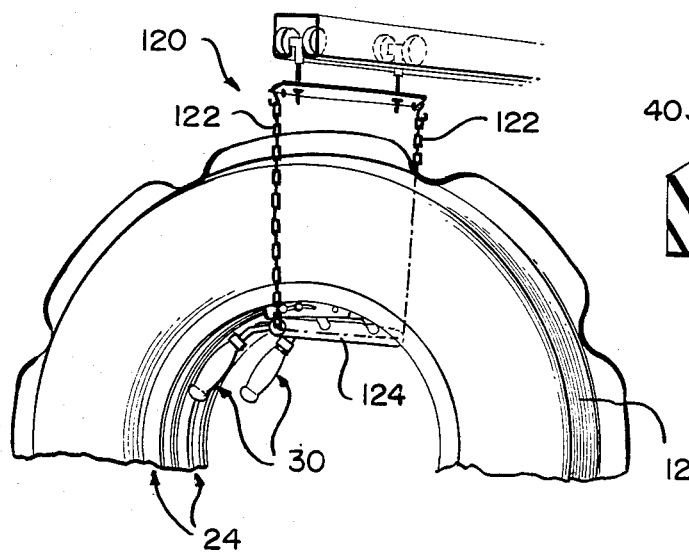
FIG. 9 is similar to FIG. 8 showing the tire assembly ready for curing and being supported by a chain hanger system.

Referring to FIGS. 8 and 9, FIG. 8 shows the tire 10 after it has been prepared for retreading and the curing envelope 12 placed on the tire 10 and the bead seal ring unit assemblies 24 positioned in sealing contact with the bead member of the radial tire 10 and the curing envelope 12. It should be noted that the locking mechanisms 30 are lined up with one another. This is not a precise line-up, but should be as close as an operator can easily position them. After the tire 10 is in this condition, it is ready to be cured. At this time, the tire 10 will be supported by a chain hanger 120. The chain hanger 120 is connected to a monorail system well-known in the art by the monorail rollers. Connecting rods hang down from the monorail rollers to a carrier member. At each end of the carrier member, support chains 122 are suspended and then connected to a support member 124. The support member 124 will act on the locking mechanism 30 between the control edge 107 and the control flanges 108. They will support the tire assembly on the upper edges of the side slide plates 72. The chain hanger 120 will provide support during the curing without causing any damage to the curing envelope 12 and the bead sealing units.

This system maintains a constant pressure by means of the spring assembly in the locking mechanism 30. This also provides a system to accommodate variations in tire constructions by various tire manufacturers. The system provides a mechanism that is lightweight, easily handled by one individual, and reduces the time of placement and removal of the sealing devices while providing positive, effective sealing features. While illustrating one embodiment of the sealing surface, outer embodiments could be employed. For example, in FIG. 13, we illustrate a smooth surface which would also be utilized in this type of sealing. The sealing ribs are preferred in our embodiment because they allow better sealing and gripping of the curing envelope. While the preferred embodiments of the sealing system have been shown and described here and in detail, those skilled in the art will recognize various alternative design embodiments for practicing the present invention as defined by the following claims.

What is claimed is:
1. A bead seal ring with unit assembly for use in retreading of radial tires in a precured tread system with a curing envelope, comprising:
   (a) a generally cylindrical rubber ring having flanges extending radially inwardly and radially outwardly at each end,
   (b) a metal band,
   (c) said ruber ring mounted on said metal band,
   (d) a mechanical locking means secured to said metal band,
   (e) said locking means having a retracted position and an expanded position,
   (f) said radial tire having a bead member with an axial bead surface forming a circumference with a bead diameter,
   (g) said ring unit having an intial diameter when said locking means is in its retracted position and an expanded diameter when in its expanded position, and
   (h) said initial diameter is smaller than said bead diameter and said expanded diameter is larger than said bead diameter.

2. A bead seal ring unit assembly as in claim 1, including:
   (a) a hook flange on the inside of the rubber ring extending around the ring,
   (b) a positioning flange on the outside of the rubber ring and extending around the ring,
   (c) a sealing surface extending across the outer surface of the rubber ring and connecting the said hook and positioning flanges, and
   (d) said sealing surface having an angle of 10° in reference to the center line of said ring unit.

3. A bead seal ring unit assembly as in claim 2, including:
   (a) said sealing surface having a series of sealing ribs.

4. A bead sealing ring unit assembly as in claim 3, including:
   (a) a receiving groove extending across the inner surface of said rubber ring and connecting the said hook and positioning flanges,
   (b) said receiving groove having slanted side surfaces, and
   (c) said slanted grooves secure said rubber ring to said metal band.

5. A bead seal ring unit assembly as in claim 1, including:

(a) said metal band having overlapping inside and outside ends,
(b) said ends are moved towards each other when said metal band is in the form of the initial diameter, and
(c) said ends are moved away from each other when said metal band is in the form of the expanded diameter.

6. A bead seal ring unit assembly as in claim 5, including:
(a) said locking means being a locking mechanism,
(b) a band bracket connecting said locking mechanism to the inside end of said metal band,
(c) a slide bracket connecting said locking mechanism to the outside end of said metal band,
(d) said slide bracket extends around said band bracket,
(e) a spring assembly rotatably connected at one end to said band bracket and between the sides of said band and slide brackets,
(f) a handle bracket rotatably connected at one end to said slide bracket,
(g) a pivot block rotatably connected to the sides of said handle bracket a predetermined position from said connection to said bracket,
(h) said spring assembly having a spring shaft member with a yoke member that connects to said band bracket and at the other end said shaft passes through said pivot block and has a control cap secured on its other end, and
(i) said spring assembly having a spring acting around the shaft and applying force on the yoke member and the pivot block.

7. A bead seal ring unit assembly as in claim 6, including:
(a) said locking mechanism having a sealing position when said metal band is in the form of a sealing diameter, (b) said sealing diameter is substantially equal to said bead diameter, and
(c) said sealing diameter is smaller than said expanded diameter.

8. A bead seal ring unit assembly as in claim 7, including:
(a) said spring being compressed between said yoke member and said pivot block when said ring unit is sealing said curing envelope between said sealing surface and said axial bead surface, and said metal band is in the form of said sealing diameter, and
(b) said control cap moves away from said pivot block to disclose the sealing force of a predetermined spring.

9. A bead seal ring unit assembly as in claim 8, including:
(a) a hook flange on the inside of the rubber ring extending around the ring,
(b) a positioning flange on the outside of the rubber ring and extending around the ring,
(c) a sealing surface extending across the outer surface of the rubber ring and connecting the said hook and positioning flanges, and
(d) said sealing surface having an angle of 10° in reference to the center line of said ring unit.

10. A bead seal ring unit assembly as in claim 9, including:
(a) said sealing surface having a series of sealing ribs.

11. A bead sealing ring unit assembly as in claim 10, including:
(a) a receiving groove extending across the inner surface of said rubber ring and connecting the said hook and positioning flanges,
(b) said receiving groove having slanted side surfaces, and
(c) said slanted grooves secure said rubber ring to said metal band.

* * * * *